United States Patent [19]
Fung et al.

[11] 3,964,933
[45] June 22, 1976

[54] CARBON ARTICLE INCLUDING ELECTRODES AND METHODS OF MAKING THE SAME

[75] Inventors: Shun Chong Fung, Edison; Samuel J. Tauster, Englishtown, both of N.J.

[73] Assignee: Exxon Research and Engineering Company, Linden, N.J.

[22] Filed: Apr. 8, 1974

[21] Appl. No.: 458,543

[52] U.S. Cl. ............................................... 136/121
[51] Int. Cl.² ...................................... H01M 13/02
[58] Field of Search .......................... 136/121–122, 136/86 D; 117/226, 46 CG, 46 R, 46 CB; 423/448, 458; 264/81; 252/511

[56] References Cited
UNITED STATES PATENTS

| | | | |
|---|---|---|---|
| 2,669,598 | 2/1954 | Marko et al. | 136/122 |
| 2,767,289 | 10/1956 | Robinson | 117/226 X |
| 3,077,507 | 2/1963 | Kordesch et al. | 136/86 D |
| 3,477,877 | 11/1969 | Kordesch | 136/86 D |
| 3,488,225 | 1/1970 | Selker et al. | 136/86 D |

*Primary Examiner*—Anthony Skapars
*Attorney, Agent, or Firm*—Joseph J. Dvorak

[57] ABSTRACT

Carbon compositions comprising carbon supported on oxide supports are provided by vapor deposition of the carbon. The carbon so deposited has the morphology of the underlying support. These carbon compositions are electrically conducting and are particularly useful as an electrode material.

4 Claims, 6 Drawing Figures

CARBON ARTICLE INCLUDING ELECTRODES AND METHODS OF MAKING THE SAME

BACKGROUND OF THE INVENTION

This invention relates to a new carbon containing composition and method of manufacture thereof. More particularly, the present invention relates to improved porous carbon bodies, especially those carbon bodies adapted for use as electrodes.

The use of carbon as a catalyst support for numerous chemical and electrochemical reactions is known. One of the recognized advantages of powdered carbon as a catalyst support is the large contact area provided by the highly irregular surface of the carbon particles. For example, the catalytic efficiency of an electrode is directly related to surface contact area of the electrocatalyst; consequently, compacted porous carbon has found use as an electrocatalyst support. In these electrode structures, activated catalytic metal is deposited on the surface of the compacted carbon. Notwithstanding the known advantages of carbon as a support material, and as an active electrode material, the carbon does not always have sufficient ability to disperse catalytically active materials. On the other hand, metal oxides such as alumina, silica, magnesium oxide, titanium dioxide, barium titanate, niobium pentoxide and the like can be employed as catalytic support materials, particularly since these oxides often are inert under the conditions of use. For electrochemical reactions, however, these metal oxides are substantially insulating or nonconducting, and therefore the oxides are not suitable in electrode structures.

SUMMARY OF THE INVENTION

In one aspect of the present invention, there is provided a novel carbon composition comprising a nonconductive oxide which has a deposit of carbon on the surface thereof. The morphology of the carbon deposited on the surface of the nonconducting oxide is substantially identical to that of the oxide. Among the suitable nonconducting oxides included in the carbon composite of the present invention are the oxides of magnesium, titanium niobium, manganese, iron, cobalt, nickel, zinc, aluminum and silica. The carbon deposited on the surface of the oxide is present in amounts sufficient to render the composite electrically conducting. In the case of those oxides which, upon reduction, form nonstoichiometric compounds, the carbon may be present in amounts as low as 12 wt. % based on the weight of carbon and oxide, and generally the carbon is present in the range from about 2 to 12 wt. %; whereas in those oxides which do not form nonstoichiometric compounds by reduction, the amount of carbon required to render the composition sufficiently electrically conductive will range from about 50 wt. % to about 90 wt. %.

In one embodiment of the present invention, a process for rendering nonconductive oxide supports electrically conductive is provided which comprises depositing carbon on the surface of the nonconducting oxide. The carbon is deposited preferably by thermally decomposing a hydrocarbon in the presence of the oxide. When the nonconducting oxide is a material which will also undergo reduction to form nonstoichiometric compounds, the carbon is deposited in amounts sufficient to render the oxide conducting, for example, in the range of about 2 to 12%; and when the nonconducting oxide is a material which will not be reduced to form a non-stoichiometric compound, the carbon generally is deposited in an amount ranging from 4 to about 20 wt. % and thereafter, the carbon coated oxide is treated, for example with acid, so as to remove sufficient oxide to render the carbon composition electrically conducting.

In another aspect of the present invention there is provided a novel electrode structure comprising a coherent mass of nonconducting oxide powder particles having deposited on the surface thereof carbon particles, the morphology of which is substantially identical to that of the oxide. This and other features of the instant invention will become apparent from the detailed description which follows.

THE FIGURES

DETAILED DESCRIPTION OF THE INVENTION

Figure 1:
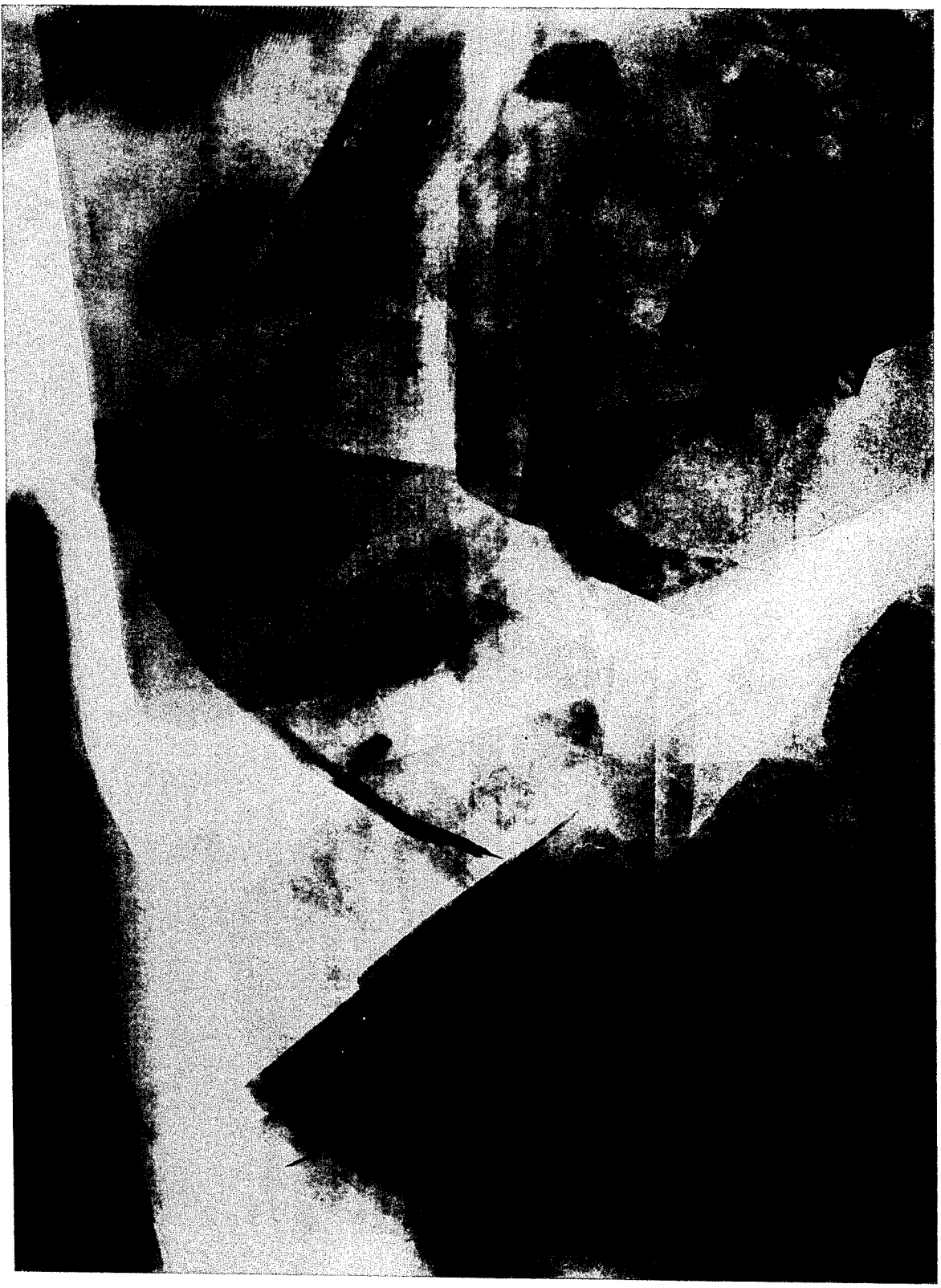
FIG. 1 is an electron micrograph having a magnification factor of 280,000 of a commercially available graphite.

When preparing the composite of the instant invention any oxide may be used as a support for the carbon. Generally, the support material will be a substantially electrically insulating oxide, i.e. a nonconducting oxide. Most preferably, the oxide will be selected from those oxides normally used as catalyst supports. Thus, the especially favored oxide supports of the instant invention consist of $Al_2O_3$, $TiO_2$, $BaTiO_3$, MgO, $MoO_2$, ZnO, $Nb_2O_5$, MnO, NiO, $SiO_2$ and $Co_2O_3$.

In the practice of the instant invention, it is particularly preferred that the oxide material be finely divided and have a high surface area. While the requirement for high surface area is not necessary for obtaining sufficient deposition of carbon on the oxide, it is especially preferred when the carbon composite is to be fabricated into a catalyst support on an electrode, for example.

The nonconducting oxide support is carbonized by treating the oxide with a hydrocarbon gas stream under pyrolysis conditions. For example, the oxide powder may be treated with carbon monoxide, or an olefin such as ethylene or propylene, or an alkane such as propane, at temperatures ranging generally from about 500°C. to about 750°C. at a pressure of about 15 psi. For example, if ethylene is the hydrocarbon employed, the pyrolysis temperatures range generally from about 600°C. to about 700°C. at 15 psi pressure. In the instance of the pyrolysis of alkanes, the preferred temperature range is from about 500°C. to about 600°C. at 15 psi pressure. Elevated pressures, of course, may also be used.

In any event, under the foregoing conditions, carbon is deposited on the surface of the metal oxide. The pyrolysis is continued until sufficient carbon is deposited. Generally, the amount of carbon deposited will range between about 2 wt. % to about 20 wt. % based on the weight of oxide present. For those oxides which undergo reduction to form nonstoichiometric compounds under the pyrolysis conditions the amount of carbon that will be deposited is only an amount sufficient to render the oxide conducting and generally from about 2 wt. % to about 12 wt. % based on the weight of the oxide. Typical of those oxides which will form nonstoichiometric compounds are barium titanate, titanium dioxide and niobium pentoxide. The preferred amount of carbon that is deposited on these foregoing oxides is in the range of from 2 wt. % to 5 wt. %.

While the amount of carbon that is deposited on the surface of the oxide in the carbonization step generally does not range above 20 wt. %, the amount of carbon in the carbon-oxide composition is increased by extracting or leaching oxide from the carbonized substrate. Indeed, in those instances where the carbonized oxide is nonconducting even after the pyrolysis step it is necessary to extract or leach oxide from the carbonized oxide material. For example, in the case of when 2 wt. % carbon is deposited on magnesium oxide or 12 wt. % carbon is deposited on alumina, the resultant material would be treated with an acid such as nitric acid so as to provide a material containing about 50 wt. % carbon and up to about 90 wt. % based on the total weight of carbon and oxide.

Additionally, it should be noted that to facilitate the pyrolysis reaction, the catalyst optionally is deposited on the oxide prior to treatment with the carbonaceous gas stream. Thus, for example, alumina can be treated, or impregnated with a platinum salt and thereafter activated so as to provide dispersion of platinum metal on the surface of alumina. This metallized alumina is then treated with the carbonaceous gas stream under pyrolysis conditions. However, it is generally preferred that the oxide not be treated with the catalyst prior to the pyrolysis reaction; rather when the carbon composition of the instant invention is going to be employed as a catalyst support, it is preferred to deposit the catalytic metal on the carbon after deposition of the carbon.

As stated previously, the nonconducting oxides are rendered conductive by treatment in accordance with the present invention. Apparently, the carbonaceous residue on the oxide surface develops into a continuous network thereby providing the substrate with electrical conductivity on a macroscopic scale.

Figure 2:
FIG. 2 is an electron micrograph having a magnification factor of 280,000 of a commercially available carbon powder.
Figure 3:
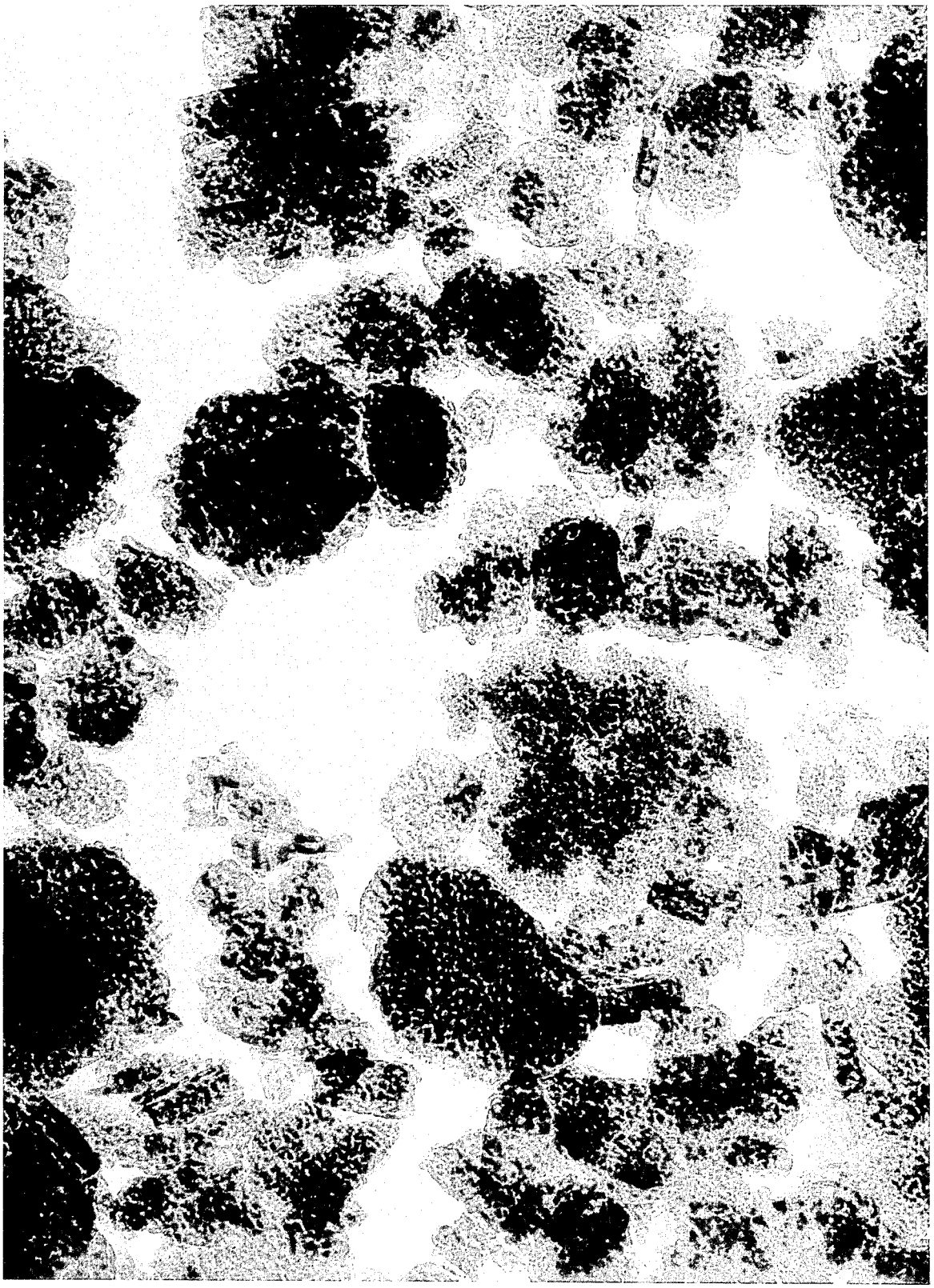
FIG. 3 is an electron micrograph having a magnification factor of 280,000 of pure alumina.
Figure 4:
FIG. 4 is an electron micrograph having a magnification factor of 280,000 of a composite of 45 wt. % carbon deposited on $Al_2O_3$ in accordance with this invention.
Figure 5:
FIG. 5 is an electron micrograph having a magnification factor of 280,000 of a composite having 85 wt. % carbon deposited on $Al_2O_3$ in accordance with this invention.
Figure 6:
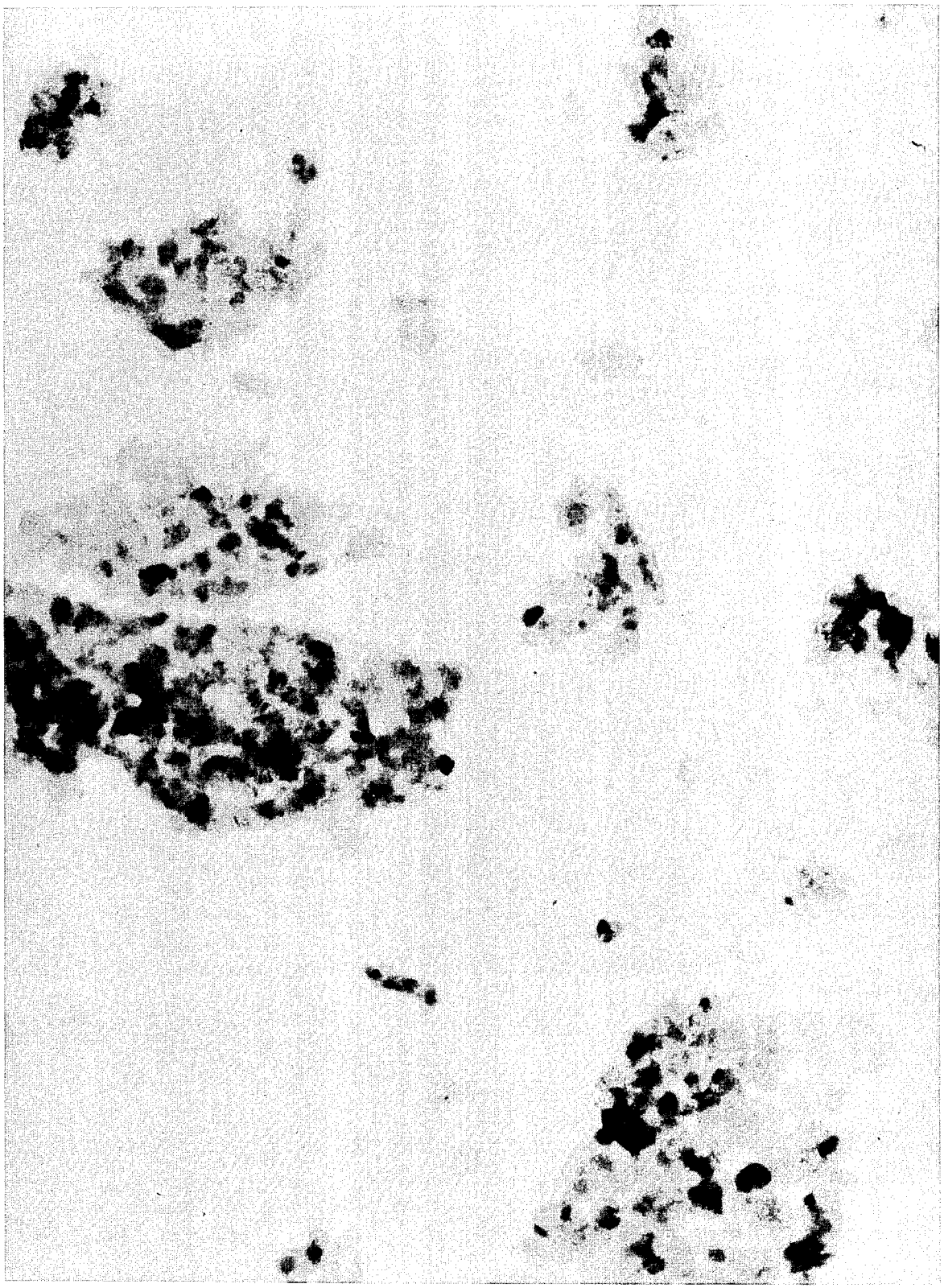
FIG. 6 is an electron micrograph of a composite according to this invention having 60 wt. % carbon on MgO.

Another significant feature of the instant invention is that the carbon deposited on the nonconducting oxide has a morphology that is substantially identical to the morphology of the substrate. This is readily apparent upon examination of the electron micrographs shown as FIGS. 1 through 6. Referring to the figures, FIG. 1 shows an electron micrograph of commercially available graphite. The crystalline morphology of the graphite is readily recognized. FIG. 2 shows an electron micrograph of an amphorphous carbon. Note the small spherical particles of this commercially available carbon powder. FIG. 3 is an electron micrograph of pure alumina. FIGS. 4 and 5 are electron micrographs of carbon deposited on alumina in accordance with the present invention. Close examination of the Figures clearly reveals that the carbon morphology in FIGS. 4 and 5 are distinct from FIGS. 1 and 2; and indeed the carbon morphology is substantially identical to the morphology of the underlying substrate. The same is true for the carbon deposited on magnesium oxide shown in FIG. 6.

The carbon composites of the present invention are electrically conducting. Indeed, these composites can be shaped, for example, into an electrode and used in a fuel cell. Normally the carbon composite will be treated first with a catalytic metal. Most typically, the catalytic metal will be one normally employed in catalyzing electrochemical reactions in fuel cells. Such typical metals include noble metals and transition metals. For example, platinum metals, combinations of platinum metals, silver, nickel, cobalt and the like, and combinations of these metals can be employed as the catalyst. In any event, the foregoing list of catalytic metals is not intended to be limiting, but merely illustrative of the metals that can be supported on the carbon composition of the instant invention.

Generally, the catalyst is deposited on the carbon composition of the instant invention by the well known techniques for impregnating activated carbons. For example, the carbon composition can be treated with aqueous salt solution of the catalytic metal and the so treated carbon composition subsequently dried and activated, for example, with flowing hydrogen. Techniques for impregnating carbon bodies are well known and do not form a part of the instant invention.

The invention will be further understood by reference to the following specific examples.

EXAMPLE 1

Nonconducting oxides of titanium, niobium and strontium titanate were each treated with the flowing stream of propylene at 500° to 650°C. Since each of these oxides form nonstoichiometric compounds under the pyrolysis conditions, no removal of the oxide was carried out after carbonization. Details of the preparation is outlined in Table I below.

TABLE I

| Oxide | Pyrolysis Temp. | Weight of Carbon Deposited |
|---|---|---|
| $TiO_2$ | 650°C. | 7% |
| $Nb_2O_5$ | 500°C. | 6.4% |
| $SrTiO_3$ | 650°C. | 3% |

The above composition was formed into an electrode by mixing 0.2 grams of the carbon composition with an aqueous suspension of polytetrafluoroethylene as binder and pressing the resultant paste onto an expanded steel screen. The finished electrode had a 5 cm$^2$ exposed catalyst area which was tested in a half-cell having a buffer electrolyte. Air was used as the oxidant at a flow rate of 17 to 22 cc/second. The activity of the electrode is monitored continuously by a potentiotactic sweep at 0.5 mv/second. In Table II below the current density obtained for the oxides at 0 volts vs ENH (Standard hydrogen electrode) and at 0.1 volt below 0 ENH.

TABLE II

CATHODE ACTIVITIES OF OXIDES IN BUFFER ELECTROLYTE AT 75°C.

| | Current density ma/cm² at zero ENH | Current density ma/cm² at 0.1 volt below ENH |
|---|---|---|
| Carbonized SrTiO₃ | 4 | 35 |
| Carbonized TiO₂ Anatase | 13 | 90 |
| Carbonized Nb₂O₅ | 7 | 26 |

EXAMPLE 2

In these tests barium titanate and titanium dioxide anatase were carbonized with ethylene at 650°C. for two hours. Thereafter, the carbon composite was impregnated with an aqueous solution of $H_2PtCl_6$ and $RuCl_3$. For comparison purposes a commercially available carbon powder sold under the tradename "Carbolac" by the Cabot Corporation was also impregnated with the platinum-ruthenium catalyst. Each of the materials was then shaped into an electrode disc using a silver screen as the current collector. In the case of Carbolac, however, because of the low density and poor cohesion 10 to 15% polyvinylchloride binder was required. Thereafter, the electrodes were tested in a half-cell for performance in the electrochemical oxidation of methanol in buffer electrolyte. In Table III below the activity of the various electrodes is shown to be much higher at low current densities, i.e., at current densities up to 40 ma/cm² than the Carbolac supported catalyst.

TABLE III

| Catalyst Support | Catalyst | Weight of Noble Metal | Current density of .2 volt Polarized | Current density of .3 volt Polarized |
|---|---|---|---|---|
| Carbonized BaTiO₃, 3% Carbon | 1% Pt 1% Ru | 320 mg/cm² | 10 ma/cm² | 45 ma/cm² |
| Carbonized TiO₂ 7% Carbon | 2% Pt 2% Ru | 330 mg/cm² | 8 mg/cm² | 40 ma/cm² |
| Carbolac | 2% Pt 2% Ru | 300 mg/cm² | 4.2 ma/cm² | 27 ma/cm² |

EXAMPLE 3

In this example two carbon composites were prepared using the oxides listed in Table IV below. Carbonization conditions are also outlined in the table.

TABLE IV

| Oxides | Hydrocarbon | Pyrolysis Temp. | Amount of Carbon Deposited |
|---|---|---|---|
| Al₂O₃ | Ethylene | 600°C. | 12% |
| MgO | Ethylene | 600°C. | 15% |

After the carbon was deposited, the powders were suspended in an acid solution to dissolve excess oxide. The suspension was filtered and the filtrate dried. The conditions and results are outlined in Table V below.

TABLE V

| Carbonized Oxides | Acid Used | Conc. of Acid | Temp. at which Extr. Cond. | Amount of Carbon in Resultant Product |
|---|---|---|---|---|
| Al₂O₃ | HBF₄ | Conc. | 75°C. | 73% |
| MgO | HNO₃ | 3N | 25°C. | 31% |

Finally, the carbon composition was impregnated with an aqueous solution of $RuCl_3$ and $H_2PtCl_6$ and reduced in hydrogen at 300°C. For comparative purposes a commercially available carbon sold under the name Carbolac was also impregnated with $RuCl_3$ and $H_2PtCl_6$. The impregnated materials were shaped into electrodes and tested for methanol oxidation in basic electrolyte at 75°C. The results of these tests are listed in the Table VI below.

TABLE VI

| Catalyst Support | Catalyst | Weight of Noble Metal | Current density of .2 volt Polarized | Current density of .3 volt Polarized |
|---|---|---|---|---|
| Carbonized Al₂O₃ 73% Carbon | 2% Pt 2% Ru | 67 mg/cm² | 10 ma/cm² | 27 ma/cm² |
| Carbonized MgO 31% Carbon | 2% Pt 2% Ru | 77 mg/cm² | 5.6 ma/cm² | 14 ma/cm² |
| Carbolac | 2% Pt 2% Ru | 80 mg/cm² | 3.6 ma/cm² | 12 ma/cm² |

To further illustrate the unique properties of the carbon composites of the present invention mixtures of commercially available carbon powder and no-conducting oxides were impregnated with noble metal catalysts, shaped into electrodes and tested in half-cells for methanol oxidation in basic electrolyte. The results are given in Table VII below.

TABLE VII

| Catalyst | Amount of Added Oxide | Amount of Added Carbolac | Wt. of Noble Metal | Current density of .2 volt Polarized | Current density of .3 volt Polarized |
|---|---|---|---|---|---|
| 2% Pt, 2% Ru on Carbolac | None | | 300 mg/cm² | 4.2 ma/cm² | 27 ma/cm² |
| 1% Pt, 1% Ru on Carbolac | 15% MgO | | 324 mg/cm² | 4.2 ma/cm² | 11 ma/cm² |
| 1% Pt, 1% Ru on Carbolac | 10% Al₂O₃ | | 324 | 4.2 ma/cm² | 17 ma/cm² |
| 2% Pt, 2% Ru or TiO₂ | 50% | Carbolac | 270 | — | 3.5 ma/cm² |

As can be seen from the foregoing the carbonized oxides of the present invention display higher activity than physical mixtures of carbon and oxide or indeed than carbon alone.

What is claimed is:

1. An electrically conducting carbon composition comprising a non-conductive oxide which has a deposit of from about 2 wt. % to about 12 wt. % of carbon on the surface thereof, said oxide being one which forms nonstoichiometric compounds upon reduction, and the morphology of the deposited carbon being substantially identical to that of the oxide when observed by electron micrograph.

2. The composition of claim 1 wherein the oxide is selected from the group consisting of $TiO_2$, $Nb_2O_5$ and $BaTiO_3$.

3. An electrode for a fuel cell comprising a nonconducting oxide which forms nonstoichiometric compounds upon reduction, said oxide having a deposit of from about 2 wt. % to about 12 wt. % of carbon on the surface thereof, the morphology of the deposited carbon being substantially identical to that of the oxide, said carbonized oxide being compacted to a mass.

4. The electrode of claim 3 wherein an electrocatalyst is deposited on the carbon.

* * * * *

UNITED STATES PATENT OFFICE
CERTIFICATE OF CORRECTION

PATENT NO. : 3,964,933
DATED : June 22, 1976
INVENTOR(S) : Shun Chong Fung et al It is certified that error appears in the above-identified patent and that said Letters Patent are hereby corrected as shown below:

Column 5, lines 36, 38 and 40, under "Weight of Noble Metal" change "mg/cm$^2$" to -- $\mu$g/cm$^2$ --, each occurrence.

Column 5, line 38, under ".2 volt Polarized" change "8 mg/cm$^2$" to -- 8 ma/cm$^2$ --.

Column 6, lines 12, 14, 17, 33 and 35, under "Weight of Noble Metal" change "mg/cm$^2$" to -- $\mu$g/cm$^2$ --, each occurrence.

Column 6, lines 38 and 40, under each of "324" and "270", respectively, add -- $\mu$g/cm$^2$ --.

Signed and Sealed this

Twenty-ninth Day of March 1977

[SEAL]

Attest:

RUTH C. MASON
*Attesting Officer*

C. MARSHALL DANN
*Commissioner of Patents and Trademarks*